United States Patent [19]
Worley

[11] 4,273,565
[45] Jun. 16, 1981

[54] CYCLONE SUPPORT

[75] Inventor: Arthur C. Worley, Mt. Tabor, N.J.

[73] Assignee: Exxon Research & Engineering Co., Florham Park, N.J.

[21] Appl. No.: 122,232

[22] Filed: Feb. 15, 1980

Related U.S. Application Data

[63] Continuation of Ser. No. 902,952, May 5, 1978, abandoned.

[51] Int. Cl.$^3$ ............................................. B01D 45/12
[52] U.S. Cl. .................................... 55/343; 55/345; 55/459 R; 248/317; 422/147; 422/310
[58] Field of Search .................. 55/343, 342, 345–349, 55/447, 459 R; 248/317, DIG. 1; 422/147, 310

[56] References Cited

U.S. PATENT DOCUMENTS

| | | |
|---|---|---|
| 2,394,680 | 2/1946 | Gerhold et al. |
| 2,439,850 | 4/1948 | Heller . |
| 2,696,895 | 12/1954 | Phyl . |
| 2,722,476 | 11/1955 | Burnside et al. |
| 2,728,642 | 12/1955 | Cunningham et al. |
| 2,873,175 | 2/1959 | Owens . |
| 2,985,516 | 5/1961 | Traue et al. ........................ 55/343 X |
| 2,995,207 | 8/1961 | Brandt . |
| 3,012,962 | 12/1961 | Dygert . |
| 3,053,643 | 9/1962 | Osborne . |
| 3,061,994 | 11/1962 | Mylting . |
| 3,152,066 | 10/1964 | Wickham . |
| 3,254,476 | 6/1966 | Kusek et al. ........................ 55/345 X |
| 3,333,402 | 8/1967 | Kalen ..................................... 55/345 |
| 3,480,245 | 11/1969 | Gingher .............................. 248/317 |
| 3,661,799 | 5/1972 | Cartmell . |
| 3,951,629 | 4/1976 | Kalen ..................................... 55/349 |
| 3,955,950 | 5/1976 | Miller, Jr. ....................... 248/317 X |
| 3,982,902 | 9/1976 | Lortz . |

FOREIGN PATENT DOCUMENTS 1239323  7/1971  United Kingdom ............. 248/DIG. 1

Primary Examiner—Kathleen J. Prunner
Attorney, Agent, or Firm—F. Donald Paris

[57] ABSTRACT

In a vessel such as for a fluid coker burner, there is provided a plenum chamber which functions as a collection header for the clean gas discharge from a plurality of cyclone stages supported within the vessel. The plenum chamber comprises a cylindrically-shaped support skirt welded at one end to the vessel head and at the other end to a relatively thin, flat steel floor, no more than about three-sixteenths to five-eighths of an inch thick. Each of the cyclone stages are individually and separately supported by support means connected directly between each stage and the vessel head and the plenum chamber floor is welded to the cyclone stages, thereby supporting the floor. This permits use of a thinner plenum chamber floor which is capable of sustaining distortions which arise from the differential vertical thermal expansions of the cyclone stages during operation.

5 Claims, 6 Drawing Figures

CYCLONE SUPPORT

This is a continuation of application Ser. No. 902,952, filed May 5, 1978, and now abandoned.

BACKGROUND OF THE INVENTION

The present invention relates to improved means for supporting equipment which is subjected to relatively high temperature differentials which cause both vertical and horizontal expansions. More particularly, the invention relates to such improved support means when used in connection with equipment such as a cyclone separator stage, which forms part of a burner vessel employed in fluid coking.

A conventional way of supporting cyclones is to support them from the vessel head by rods and from the plenum chamber by the outlet ducts. The plenum chamber comprises a cylindrical skirt welded to the vessel head and is enclosed at the bottom by a dished floor member welded to the lower edge of the skirt. According to this arrangement, some of the cyclones are supported from the vessel head and some from the plenum chamber floor. The problem with such arrangements is that the support system is subjected to different temperatures which causes thermal expansion problems. Other known designs support all of the cyclones from the plenum chamber by means of rods and cyclone outlet ducts and this type support system avoids the problem of differential thermal expansion. In these conventional cyclone systems, the plenum chamber floors are generally fairly thick, for example, on the order of one inch or more, and are constructed to carry the weight and differential pressure loads of the cyclones during operation of the vessel. The need for this heavy construction is due to the load imposed on the floor by the cyclones which introduce compound stresses, i.e. primary bending and tensile stresses in the plenum floor and cylindrical support skirt.

Other prior art arrangements for supporting cyclone separators are shown in U.S. Pat. No. 3,951,629 wherein a support beam secured to the vessel head by support bars actually supports the cyclone separators. This patent also discloses the expedient providing a thinner floor (see Column 4, lines 50–53); however, the support rods or bars do not directly support the operator stages and there is no floor supported by the rods. U.S. Pat. No. 3,982,902 discloses a support for cyclone separators which employs a horizontal bar that is pivotally mounted to the vessel wall. U.S. Pat. No. 2,873,175 discloses a cyclone supported from the vessel head (see Column 7, lines 31–35); however, there is no plenum chamber disclosed in the patent. Still yet another support scheme for cyclones is disclosed in U.S. Pat. No. 2,439,850 wherein the cyclones are attached to each other such that they move as a unit.

None of the prior art, however, is considered to afford the advantages of a cyclone support system wherein the plenum chamber is constructed and arranged to accommodate thermal expansion and wherein the plenum chamber serves to separate and contain the relatively clean gas generated from the dilute phases produced in the vessel and does not support the cyclones; but instead the cyclones are supported by individual support means connected directly to the head of the vessel and the plenum chamber floor in turn is supported by the cyclones.

SUMMARY OF THE INVENTION

According to the present invention there is provided a relatively thin flat steel floor which forms part of the plenum chamber in a vessel such as may be found in a fluid coker burner, which affords flexing of the floor that may be caused by differential thermal movement of the cyclones in the vessel. The floor is supported by an attachment to each of the cyclone stages which themselves are independently harnessed or supported from the vessel head by means of support rods or straps. The rods which support each of the cyclones are basically in tension and because of the relatively large number of cyclone stages, a simple flat plate on the order of 3/16"-⅜" thick can be employed since the unsupported spans of the floor between the cyclones are small which reduces and/or eliminates the need for horizontal supports between the cyclones themselves.

This cyclone system support/plenum chamber design differs from conventional systems in that the cyclones are individually supported by rods from the vessel head. The plenum head itself serves no support function except to separate and contain the relatively clean gas from the dilute gas phase which has passed through the cyclone system. Most cyclone systems consist of a primary and secondary cyclone, i.e., two stages and these are generally arranged so that a number of primary cyclones can be located below the cylindrical skirt joining the vessel head and the plenum chamber floor. It is, therefore, possible to support these primary cyclones by rods from the skirt. Since the plenum chamber floor does not support the cyclones, the floor can be made thinner. By welding the plenum floor to the cyclones themselves, the floor is supported by the cyclones for the differential pressure which acts on the floor. The cyclones themselves then support the plenum chamber floor, while in a conventional cyclone system, the plenum floor and plenum skirt support the cyclone. Since the individual supports of the cyclones vary in length, there will be some small differential thermal expansion in the support rods. These expansion differences can be absorbed by the relatively thin and flexible plenum chamber floor which is welded to each of the cyclones. With a conventional arrangement, the floor is heavy, often one inch or more in thickness, which allows little or no flexing to make up for differential thermal expansion.

Other objects and advantages of the present invention will become apparent from the following description when taken in connection with the accompanying drawings which illustrate various embodiments of the present invention.

DESCRIPTION OF THE PREFERRED EMBODIMENTS

Figure 1:
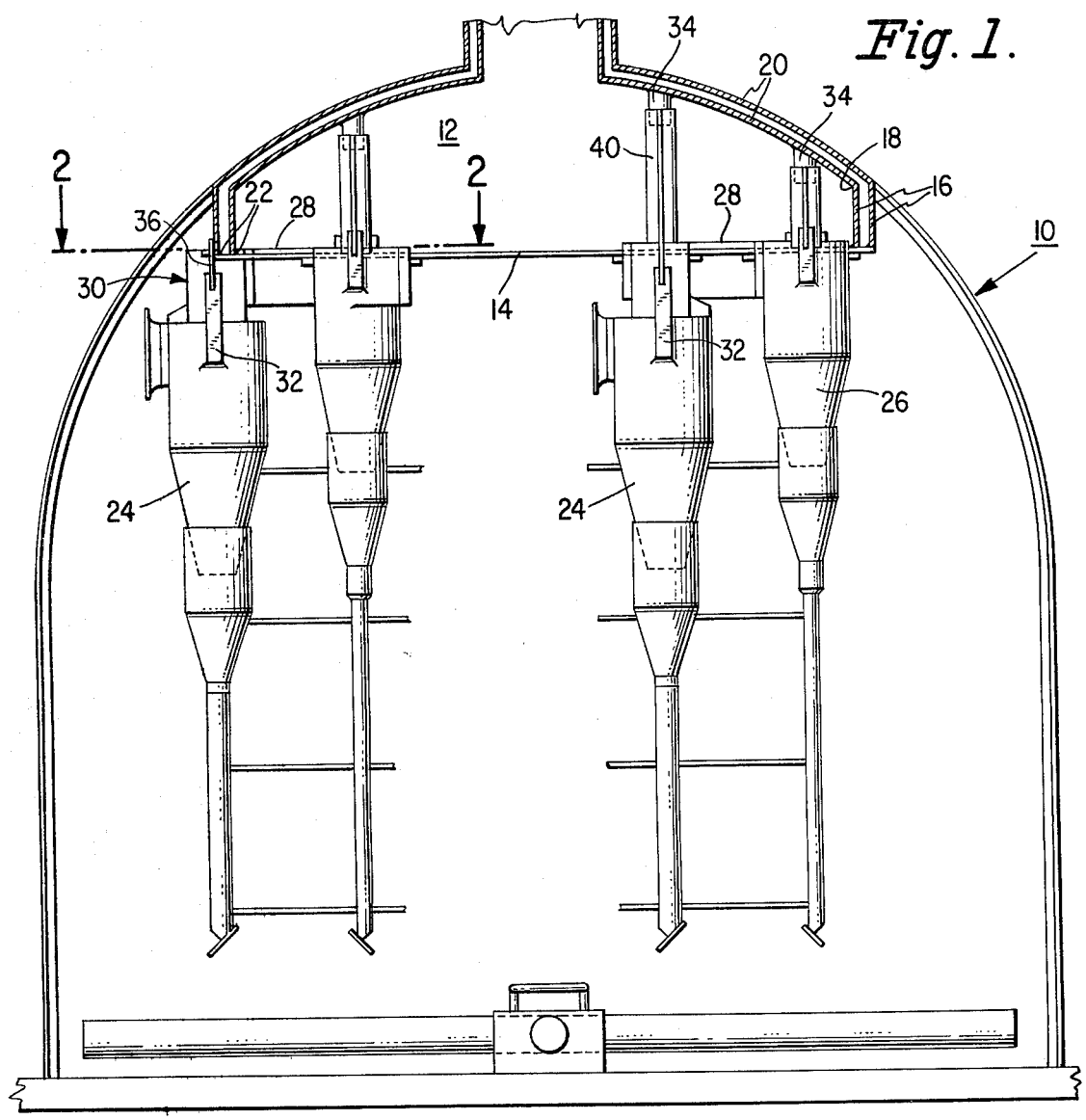
FIG. 1 is a partial elevational view of a vessel having cyclone separator stages mounted independently and supporting a plenum chamber floor in accordance with the present invention.
Figure 2:
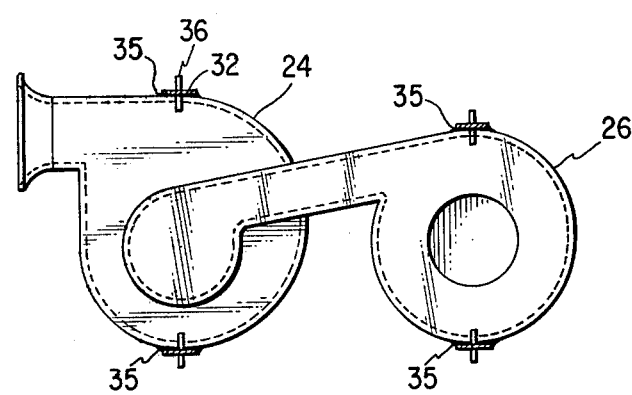
FIG. 2 illustrates a cross-sectional view taken substantially on the line 2—2 of FIG. 1 illustrating the independently supported cyclones.
Figure 3:
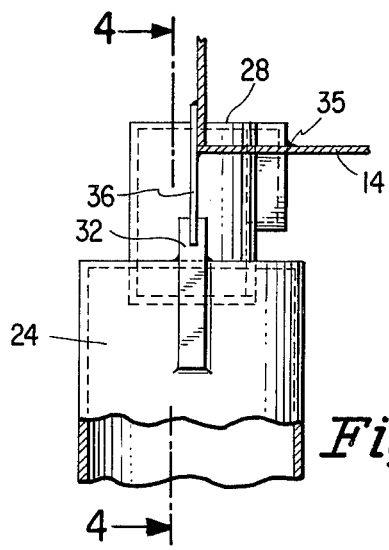
FIG. 3 illustrates an enlargement of the support for the primary cyclone stage of FIG. 1.

Having reference to the drawings wherein like parts are designated by the same reference numerals throughout the several views, there is shown in FIG. 1 a typical fluid coker vessel 10 having a plenum chamber 12 which comprises a thin plate flat floor 14 preferably of steel and a cylindrical support skirt 16 which is welded as shown at 18 to the vessel head portion 20 and at the other or opposite end is welded to the floor 14 as shown in 22. The plenum chamber 12 functions as a collection header for the gas which is discharged from a plurality of primary and secondary cyclone stages 24, 26 respectively, which are in the vessel. It is recognized that while the invention is disclosed in its preferred embodiment in a fluid coker burner vessel other vessels such as fluid catalytic cracking, fluidized iron ore, or other fluid solids processes also are within the contemplation of this invention, which relates to the support system for the cyclone stages and the plenum chamber floor. The present support system has utility in any vessel so long as it employs the basic components of a plenum chamber. The plenum chamber is designed to facilitate thermal expansion through flexure in response to the temperature differentials which will occur during operation of the unit. It serves to separate and contain the clean gas which is exhausted from the cyclone outlet 28 that penetrates the plenum chamber floor 14.

Figure 4:
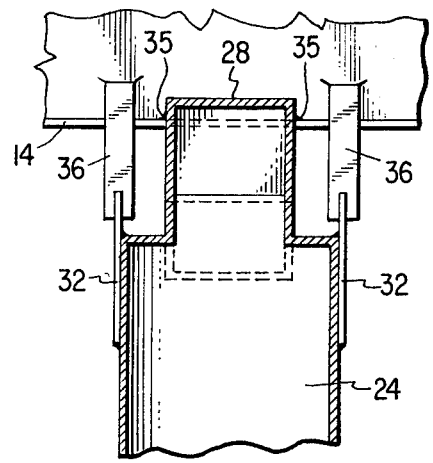
FIG. 4 illustrates a cross-sectional view taken substantially on the line 4—4 of FIG. 3.
Figure 5:
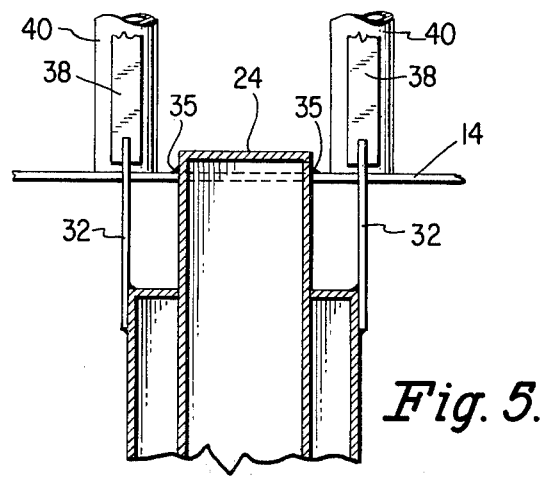
FIG. 5 illustrates an enlarged partial cross-sectional view illustrating the support in detail for mounting the primary cyclone stages relative to the floor.
Figure 6:
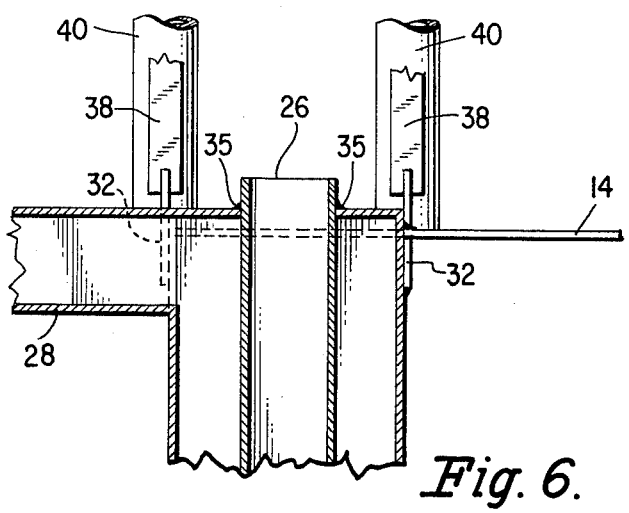
FIG. 6 illustrates a cross-sectional view of a secondary cyclone.

Each of the cyclone stages (only a relatively small number are shown for purposes of illustrating the present invention) are individually supported by means generally designated 30 which include hanger straps 32. Each cyclone has two support means 30 wherein the straps 32 which are connected with straps 36 are welded on either side of the cyclone body. The support means extend through the plenum floor upward to the vessel head 20 where they are welded directly to mounting brackets or lugs 34 extending downward therefrom or to support skirt 16 as shown in FIG. 1 for the outer one of the stages 24. The plenum chamber floor 14 is welded to the cyclones as shown at 35 (see FIGS. 4, 5 and 6) for purposes of supporting the floor in contrast to conventional schemes which utilize a heavy floor capable of supporting the cyclones. The flexure of the floor will occur based on the pressure differential which occurs between the inlet into the primary cyclones and the outlet from the secondary cyclones. Because the cyclones are many in number and are relatively closely and uniformly spaced in a conventional manner, this affords the opportunity to employ the relatively thin flat floor which accept a small amount of distortion resulting from the differential vertical thermal movement between the different cyclone stages.

The supporting system is normally stretched (i.e. in tension) because of the load imposed thereon by the supported cyclones. However, the support system could be in compression because of the differential pressure acting on the plenum floor. The upward pressure force therefrom would exceed the weight load of the cyclones. As mentioned heretofore, the straps 32 are secured, e.g. by welding, to opposed sides of the cyclone and in the case of the secondary and some primary cyclones extend upward for a predetermined distance through and above the plenum chamber floor. At this point, the portion of the strap 32 which extends above the floor 14 is connected (e.g. by welding) to a further support member or strap 36 oriented at a right angle relative thereto. The strap 36 extends upward and is secured to the downward protruding brackets 34 from the vessel head 20, or directly to skirt 16 in the case of the outer stage as shown in FIG. 1. The hanger straps 32 of some of the primary cyclones 24 terminate at their upper end below the plenum floor 14. A metal shroud 40 is placed about the portion of the support within the plenum chamber for thermal protection of the support member as a means of reducing the metal temperature of the support so as to reduce the vertical differential thermal expansion between the cyclones and the plenum skirt.

What is claimed is:

1. A vessel which is subjected to a high temperature differential, comprising a vessel head having a downward extending support skirt connected therewith and a plenum chamber at an end of said vessel adjacent said head; a plurality of separator stages mounted in said vessel; means located completely within said vessel including hanger strap means for separately and independently supporting each of said stages directly from said vessel head; and a relatively thin flexible plenum chamber floor having said skirt connected therewith and substantially supported only by said plurality of stages, wherein said hanger strap means extend through said floor.

2. The vessel of claim 1 wherein said supporting means comprises a pair of first hanger straps secured to opposite sides of each stage and second hanger straps rigidly secured at one end directly to said first straps and at the opposite end secured directly to said vessel head.

3. The vessel of claim 2 wherein said first and second hanger straps are relatively oriented at right angles.

4. The vessel of claim 1 wherein said plenum chamber floor is about 3/16"-⅝" thick.

5. The vessel of claim 1 including lug means protruding down from said vessel head into said plenum chamber connected with said hanger strap means between said vessel head and said hanger strap means.

* * * * *